(12) United States Patent
Bhatt et al.

(10) Patent No.: US 8,283,100 B2
(45) Date of Patent: Oct. 9, 2012

(54) COLOR FORMING COMPOSITIONS AND ASSOCIATED METHODS

(75) Inventors: Jayprakash C. Bhatt, Corvallis, OR (US); Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1514 days.

(21) Appl. No.: 11/435,670

(22) Filed: May 16, 2006

(65) Prior Publication Data

US 2007/0269737 A1 Nov. 22, 2007

(51) Int. Cl.
- *G03C 1/00* (2006.01)
- *G03C 5/00* (2006.01)
- *G03F 7/00* (2006.01)

(52) U.S. Cl. .......... 430/270.1; 430/336; 430/338
(58) Field of Classification Search .......... 430/332, 430/338, 962, 964, 270.1
See application file for complete search history.

(56) References Cited

U.S. PATENT DOCUMENTS

| | | |
|---|---|---|
| 3,383,212 A | 5/1968 | MacLachlan |
| 3,390,994 A | 7/1968 | Cescon |
| 3,390,995 A | 7/1968 | Manos |
| 3,390,996 A | 7/1968 | MacLachlan |
| 3,423,427 A | 1/1969 | Cescon et al. |
| 3,445,233 A | 5/1969 | Cescon |
| 3,445,234 A | 5/1969 | Cescon et at |
| 3,449,379 A | 6/1969 | Cescon et at |
| 3,479,185 A | 11/1969 | Chambers et al. |
| 3,533,797 A | 10/1970 | James et al. |
| 3,552,973 A | 1/1971 | Fishman et al. |
| 3,554,753 A | 1/1971 | Cohen |
| 3,563,750 A | 2/1971 | Walker |
| 3,563,751 A | 2/1971 | Cohen |
| 3,579,342 A | 5/1971 | Strilko |
| 3,585,038 A | 6/1971 | Cescon et al. |
| 3,598,592 A | 8/1971 | Cescon |
| 3,615,454 A | 10/1971 | Cescon et al. |
| 3,615,481 A | 10/1971 | Looney |
| 3,647,467 A | 3/1972 | Grubb |
| 3,658,542 A | 4/1972 | Henry, Jr. et al. |
| 3,658,543 A | 4/1972 | Gerlach, Jr. et al. |
| 3,661,461 A | 5/1972 | Dessauer et al. |
| 3,666,466 A | 5/1972 | Strilko et al. |
| 3,672,933 A | 6/1972 | Lieberman et al. |
| 3,674,523 A | 7/1972 | Connair et al. |
| 3,704,127 A | 11/1972 | Dessauer et al. |
| 3,784,557 A | 1/1974 | Cescon et al. |
| 3,847,608 A | 11/1974 | Dessauer et al. |
| 3,992,450 A | 11/1976 | Neumer |
| 4,009,040 A | 2/1977 | Nebe |
| 4,029,506 A | 6/1977 | Dessauer |
| 4,078,934 A | 3/1978 | Neumer |
| 4,207,102 A | 6/1980 | Dessauer |
| 4,232,108 A | 11/1980 | Dessauer |
| 4,247,618 A | 1/1981 | Dessauer et al. |
| 4,252,887 A | 2/1981 | Dessauer |
| 4,311,783 A | 1/1982 | Dessauer |
| 4,373,017 A * | 2/1983 | Masukawa et al. ........ 430/270.1 |
| 4,427,758 A | 1/1984 | Quinn |
| 4,622,286 A | 11/1986 | Sheets |
| 4,945,020 A | 7/1990 | Kempf et al. |
| 5,230,985 A | 7/1993 | Lohaus et al. |
| 5,350,870 A * | 9/1994 | Boggs et al. .................... 560/27 |
| 5,451,478 A | 9/1995 | Boggs et al. |
| 5,824,715 A | 10/1998 | Hayashihara et al. |
| 5,840,449 A * | 11/1998 | Zambounis et al. ............. 430/7 |
| 5,858,583 A | 1/1999 | Dessauer et al. |
| 5,955,224 A | 9/1999 | Caspar et al. |
| 6,004,719 A | 12/1999 | Gaudiana et al. |
| 6,143,480 A | 11/2000 | Obayashi et al. |
| 6,211,347 B1 * | 4/2001 | Sieber et al. .................. 534/801 |
| 6,251,571 B1 | 6/2001 | Dessauer et al. |
| 6,365,720 B1 | 4/2002 | Schacht |
| 6,528,230 B1 | 3/2003 | Takashima et al. |
| 6,713,523 B2 | 3/2004 | Nagata et al. |
| 2004/0007625 A1 * | 1/2004 | Kappe et al. .................. 235/487 |
| 2004/0226111 A1 | 11/2004 | Lagrange |
| 2005/0053863 A1 * | 3/2005 | Gore ........................ 430/270.14 |
| 2005/0075248 A1 * | 4/2005 | Gore et al. ..................... 503/227 |
| 2006/0068315 A1 * | 3/2006 | Gore ............................ 430/141 |

FOREIGN PATENT DOCUMENTS

| | | |
|---|---|---|
| EP | 0654711 | 5/1995 |
| EP | 0764693 | 3/1997 |
| EP | 0 828 182 | 3/1998 |
| EP | 0892018 | 1/1999 |
| EP | 1125995 A2 * | 8/2001 |
| EP | 1607447 | 12/2005 |
| WO | 0128778 | 4/2001 |
| WO | WO 0138103 A1 * | 5/2001 |

OTHER PUBLICATIONS

International Search Report for PCT/US2007/068565, Report Issued May 15, 2008.

* cited by examiner

*Primary Examiner* — Cynthia H Kelly
*Assistant Examiner* — Connie P Johnson

(57) ABSTRACT

Compositions and methods for forming color images on a substrate capable of development at desired wavelengths or energy levels are disclosed and described. The color forming composition can include a carrier system and a latent pigment with a pendent group, wherein the latent pigment is colorless or pale in color while the pendent group is attached, and wherein the latent pigment is convertible to a colored pigment upon removal of the pendent group. Alternatively, the latent pigment can have multiple states of conjugation where the latent pigment is colorless or pale in a first conjugation state, and colored in a second conjugation state. The color forming compositions are useful in forming images on a wide variety of substrates, such as optical disks.

26 Claims, No Drawings

COLOR FORMING COMPOSITIONS AND ASSOCIATED METHODS

FIELD OF THE INVENTION

The present invention relates generally to color forming compositions, systems, and associated methods.

BACKGROUND OF THE INVENTION

Compositions which produce a color change upon exposure to energy in the form of light or heat are of great interest in producing images on a variety of substrates. As an example, optical disks represent a significant percentage of the market for data storage of software as well as of photographic, video, and/or audio data. Typically, optical disks have data patterns embedded thereon that can be read from and/or written to one side of the optical disk, and a graphic display or label printed on the other side of the optical disk.

In order to identify the contents of the optical disk, printed patterns or graphic display information can be provided on the non-data, or label, side of the optical disk. The patterns or graphic display can be both decorative and provide pertinent information about the data content of the optical disk. In the past, commercial labeling has been routinely accomplished using screen-printing methods. While this method can provide a wide variety of label content, it tends to be cost ineffective for production of less than about 400 customized disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer-available methods of labeling are limited to either handwritten descriptions which lack professional appearance, quality and variety; or preprinted labels which may be affixed to the optical disk, but which can also adversely affect the disk performance upon spinning at high speeds.

A number of materials which can produce a color change upon exposure to energy are known. For example, such color forming materials are used in thermal printing papers, instant imaging films, and the like. These materials typically use a multi-layered composite structure and often additional processing steps. Most often, these technologies can require relatively high heat flux over somewhat long periods of time. For example, some of these methods utilize carbon dioxide lasers having energy densities of greater than 3.0 J/cm$^2$ for exposure times of greater than about 100 μsec. Therefore, there are limitations as to the types of materials which can be used as a substrate and the marking speeds.

A recent development in color forming compositions, including the use of leuco dyes, has provided color forming compositions that can be developed using energy sources to form an image. Though leuco dyes have been used with energy sources such as thermal and light-directed imaging, they suffer from the limitation of image stability because the color forming reaction is often reversible and they display poor to moderate light fastness properties. For these and other reasons, the need still exists for color forming compositions with increased image permanence.

DETAILED DESCRIPTION OF THE PREFERRED EMBODIMENT(S)

Reference will now be made to exemplary embodiments and specific language will be used herein to describe the same. It will nevertheless be understood that no limitation of the scope of the invention is thereby intended. Alterations and further modifications of the inventive features described herein and additional applications of the principles of the invention as described herein, which would occur to one skilled in the relevant art having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a radiation antenna" includes reference to one or more of such materials.

The term "latent pigment" refers to a pigment colorant that has a first configuration that is colorless or is very pale in color. The latent pigment can be converted to a more intensely colored pigment. Typically, a latent pigment includes a pendent group attached thereto that has the function of masking the color properties of the pigment while in the latent pigment state. When the pendent group is removed or modified, the color of the latent pigment becomes more pronounced or even changes in hue. Alternatively, a latent pigment can have two states where changes in conjugation allow for color modification.

The term "carrier system" includes any fluid system that includes a compound in which a latent pigment can be solvated or uniformly distributed. The carrier system can include a solvent or mixture of solvents, a polymeric matrix, and/or any other similar material. In accordance with embodiments of the present invention, the carrier system with the other components present in the color forming composition, upon drying, curing, or the like, can be transformed into a solid or film that can be written on or developed using laser energy.

As used herein, the term "color forming composition" typically includes a latent pigment and a carrier system. The latent pigment is typically colorless or pale in color; however, upon conversion of the latent pigment, such as through heat, light energy, chemical reaction, radiation, etc., the latent pigment can be converted to pigment that is more colored than the latent pigment before development. Optionally, the color forming composition can include a radiation antenna, an acid, an acid former, or other components that may be desirable for use in certain embodiments to provide acceptable development properties. These components can work together upon exposure to radiation to develop the latent pigment to cause a change in color.

For purposes of the present invention, the term "color" or "colored" can refer to change in visible absorbance that occurs upon development, including development to black, white, or traditional colors. An undeveloped latent pigment can be colorless or may have some color (pale) which changes upon development to a more intense color, e.g. more vivid color, darker, greater optical density, increased chroma, modified color, etc.

As used herein, "developing," "development," or the like refers to an interaction or reaction which affects the latent pigment in producing a visible change in color (or change from colorless to colored) through chemical reaction, photo activity, thermal activity, radiation, or other type of reaction or activity. Most often, the latent pigment can be modified through development interaction or reaction by removing a pendent group that provides at least some color masking of the latent pigment. Once removed, the latent pigment is converted to a pigment that intensifies in color.

As used herein, "radiation antenna" refers generally to a radiation sensitive agent that can generate heat or otherwise transfer energy to surrounding molecules or nearby layers upon exposure to radiation at a specific wavelength. Radiation antennae can be present in sufficient quantity so as to produce energy sufficient to at least partially develop the latent pigment by any of a number of mechanisms, e.g., melting of discontinuous phase(s) together or into a continuous phase, causing chemical reactions to begin, generating acids, providing heat, causing oxidation reactions to begin, etc. The radiation antenna can be admixed with the color forming composition, or can be in a separate layer, as long as it is in thermal contact with a latent pigment.

As used herein, "thermal contact" refers to the spatial relationship between an antenna and a latent pigment. For example, when an antenna is energized by interaction with laser radiation, the energy generated by the antenna should be sufficient to cause the latent pigment of the color forming composition to darken, change, or become colored, through a chemical or other reaction. Thermal contact can include close proximity between an antenna and a latent pigment, which allows for energy transfer from the antenna toward the latent pigment. Thermal contact can also include actual intimate contact between an antenna and a latent pigment, such as in immediately adjacent layers, in an admixture including both constituents, or in separate phases of a common composition.

As used herein, the term "coating composition," or other similar referents typically refers to carrier having various components dissolved or dispersed therein. The carrier can be a liquid or paste-like carrier, or can be one of the components of the color forming composition per se, e.g., polymer matrix, etc. In one embodiment, the composition can comprise a latent pigment phase finely dispersed in a polymeric activator phase. Other components can be present in one or both of these phases. Color forming compositions can be spin-coatable in one embodiment, or can be configured for other application methods as well, e.g., printing such as by offset, inkjet, gravure, roller coating, screen printing, spraying, or other application methods known to those skilled in the art. Once the coating composition is applied to a substrate, it can be referred to as simply a "coating."

As used herein, "optical disk" is meant to encompass audio, video, multi-media, and/or software disks that are machine readable in a CD and/or DVD drive, or next generation optical disk drives such as blu-ray or HD-DVD, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, blu-ray, HD-DVD, and the like. Other like formats may also be included, such as similar formats and formats to be developed in the future.

As used herein, "graphic display" can include any visible character or image found on an optical disk. Typically, the graphic display is found prominently on one side of the optical disk, though this is not always the case.

As used herein, "data" is typically used with respect to the present disclosure to include the non-graphic information contained on the optical disk that is digitally or otherwise embedded therein. Data can include audio information, video information, photographic information, software information, and the like. Alternatively, the term "data" is sometimes used to describe the information a computer or other processor uses to draw from in order to mark an image on a color-forming composition in accordance with embodiments of the present invention.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 μm to about 200 μm should be interpreted to include not only the explicitly recited limits of 1 μm to about 200 μm, but also to include individual sizes such as 2 μm, 3 μm, 4 μm, and sub-ranges such as 10 μm to 50 μm, 20 μm to 100 μm, etc.

It has been recognized that it would be advantageous to provide color forming compositions which can undergo color change that are capable of development thermally, chemically, by light-directed processes, by radiation, or other methods, and which can have more permanent color stability than is often provided by leuco dye systems. In accordance with the present invention, a color forming composition can include a carrier system and a latent pigment. The latent pigment can have a pendent group such that the latent pigment is pale in color or colorless while the pendent group is attached, and such that the latent pigment is convertible to a colored pigment upon removal of the pendent group. In one specific aspect of the invention, the latent pigment is soluble in the carrier system while the pendent group is attached, but upon removal of the pendent group, the latent pigment is converted to a colored pigment that is insoluble in the carrier system. Alternatively, the latent pigment can have a first conjugation state which is pale or colorless and a second conjugation state that colored. Another specific aspect of the invention includes a radiation antenna admixed with or in thermal contact with the latent pigment.

The color forming composition can be a single-phase system or a multi-phase system, e.g., dual-phase systems, tri-phase systems, quad-phase systems, etc. In one multi-phase system, a latent pigment and a reactant material can both be finely dispersed and uniformly distributed in a coating matrix. In another multi-phase system, either a latent pigment or a reactant can be dissolved in the coating matrix and the other material can be uniformly distributed in the matrix. In a single-phase system, a latent pigment and a reactant can both be dissolved in the matrix. Additionally, in any of these systems, a radiation antenna can also be dissolved or uniformly dispersed in the coating matrix as well. Other components can also be dissolved or dispersed in the coating matrix, including acid generators, photo-activated materials, radiation antennae that are also acid generators, etc. In other words, the color forming composition can be present in any combination of phases with materials either in the continuous phase or dispersed in a discontinuous phase(s) in accordance with embodiments of the present invention, as long as upon exposure to laser or another energy type of appropriate wavelength, energy level, etc., the composition can be developed. Typically, the development occurs as a pendent group of the latent pigment is removed or modified to change the color of the latent pigment, and/or as the conjugation state of the latent pigment is modified.

Many types of pigments are suitable for use as latent pigments in the color forming composition. Non-limiting examples where the latent pigment is a magenta colorant include quinacridones, diketopyrrolopyrroles (DPPs), perylenes, anthraquinones, anthranthrones, quinophthalones, isoindolinones, isoindolines, dioxazines, azos and combinations thereof. Non-limiting examples where the latent pigment is a cyan colorant include indanthrones, indigos, and combinations thereof. Non-limiting examples where the latent pigment is a yellow colorant include isoindolines, quinolonoquinolones, anthraquinones, disazos, benzimidazolone, azos, and combinations thereof.

The latent pigment can be dispersed, dissolved, or mixed within a carrier system, e.g., polymer matrix or coating forming solvent(s) system. This can be accomplished by any known method such as mixing, rolling, milling, homogenization, or the like. In most cases, it can be desirable to uniformly disperse or dissolve the latent pigment throughout the carrier system. Uniformly dispersing or dissolving the latent pigment within the carrier system allows for increased contact between the latent pigment with radiation antennae and/or other energy transfer materials, which can be present in the coating compositions and which are discussed below in more detail. Processes that are commonly used for preparing intimate mixtures include ball milling, microfluidization, sonication, microwave processing, and high pressure homogenization using APV homogenization techniques as described in U.S. Pat. No. 5,976,232, which is incorporated by reference herein. Other methods include modifications of milling processes with improvements in conventional media mill designs such as those found in Netzsch LMC mills and Drais DCP mills. These mills have incorporated smaller screen opening dimensions that allow physical separation (e.g., filtration) of larger milling media from milled substrate particles as small as 250 to 300 micrometers or less and can used to prepare intimate mixtures for use in the present invention.

The amount of latent pigment dispersed or dissolved within the carrier system can vary considerably depending on the concentration and type of latent pigment used, as well as a number of other factors such as desired development speed, desired color intensity of developed latent pigment, and the like. However, as a general guideline, the latent pigment can comprise from about 1 wt % to about 50 wt % if the coating composition as a whole. Although amounts outside this range can be successfully used, depending on the other components of the composition, amounts from about 5 wt % to about 20 wt % frequently provide adequate results.

Depending on the pendent group or conjugation state of the latent pigment, the color forming composition can be capable of development using one or more methods. Non-limiting examples of methods for developing the color forming composition include the following: chemical reaction, photo activity, thermal activity, radiation, and combinations thereof. In one detailed embodiment of the invention, the color forming composition is capable of development using radiation at less than about 0.5 J/cm$^2$. In another specific embodiment of the invention, the color forming composition is capable of development in less than about 1 millisecond. In still another detailed embodiment of the invention, the color forming composition is capable of development using electromagnetic radiation applied for about 100 μsec to about 500 μsec. Another specific embodiment of the invention includes a color forming composition that is capable of development using electromagnetic radiation applied at a power level from about 30 mW to about 50 mW.

In another specific embodiment, the color forming composition includes a dihydroquinacridone (DHQA) pigment and is capable of development using a chemical oxidation reaction to remove the pendent group and form the colored pigment quinacridone. In the specific case of DHQA, an oxidation reaction on the central ring along with conjugation (resulting in the removal of two hydrogen atoms) causes the color change. In the specific case of quinacridone pigments, such as PR122, advantage may be taken of the final step in their synthesis. The last step in the synthesis of this class of pigments is the oxidation of the DHQA. DHQAs are not colored, while the product quinacridones are used primarily as magenta colorants. This chemistry can be taken advantage of in light-activated imaging. The chemistry involved is shown schematically in the two exemplary reaction schemes diagramed below, where is R is H or N-3-(4-hydroxyphenyl)propionyl.

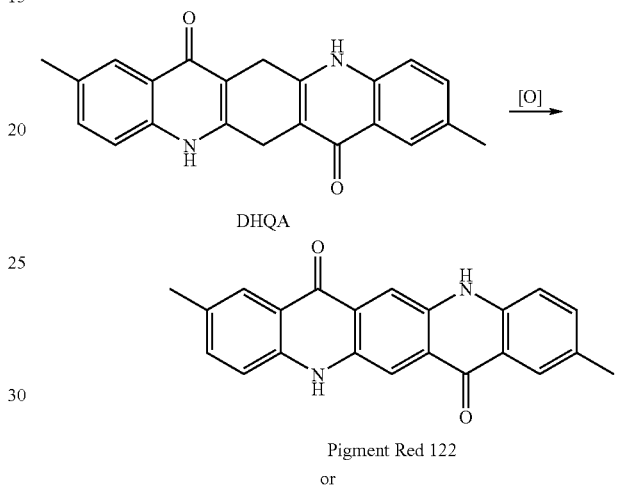

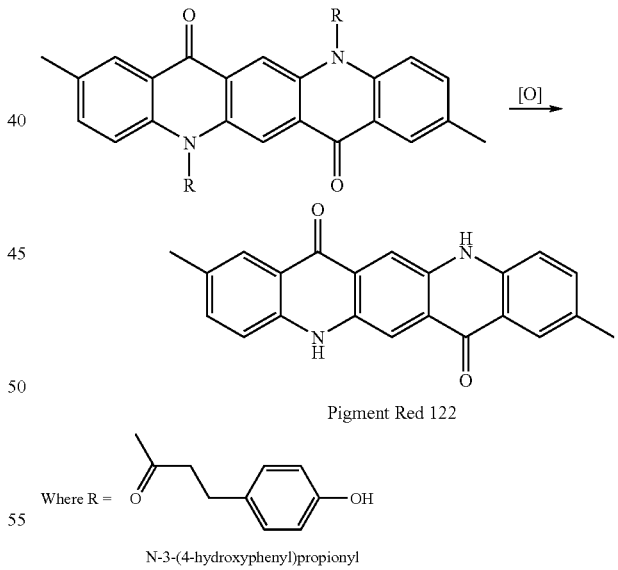

It is noted that in the two reaction schemes shown above, NH in Formula 1 can also be NR, where R is also N-3-(4-hydroxyphenyl)propionyl.

In another specific embodiment the pendent group can be a photo labile pendent group. When the pendent group is a photo labile pendent group, color change can be accomplished by applying laser energy of appropriate development wavelength for removal of the pendent group.

Formula 3

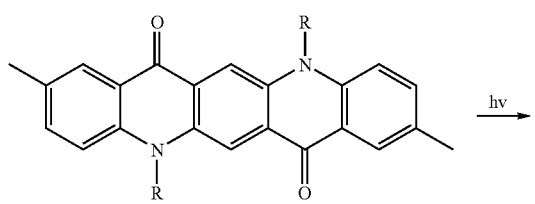

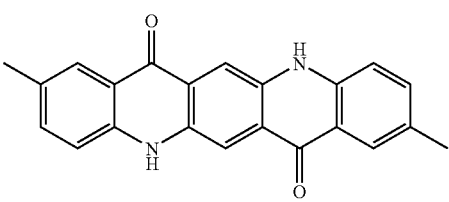
Pigment Red 122

Non-limiting examples of photo labile pendent groups, R, independently include any of the following structures:

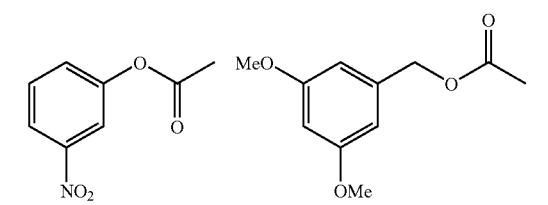

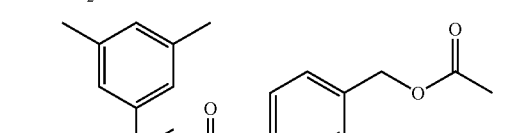

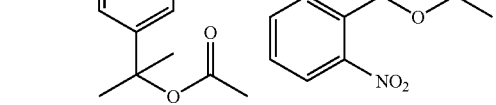

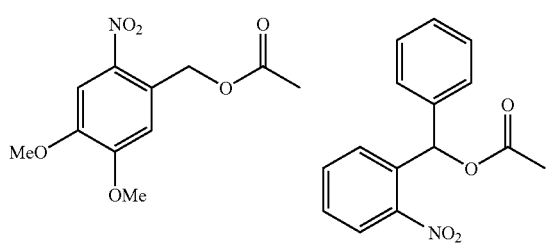

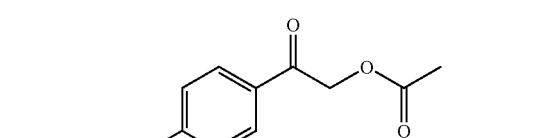

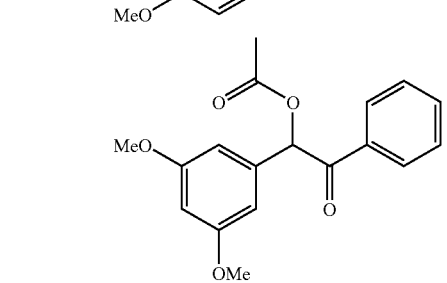

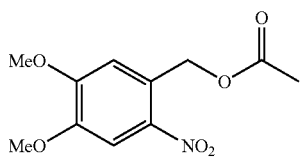

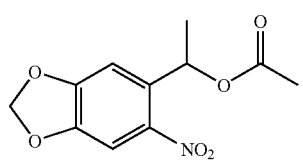

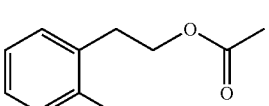

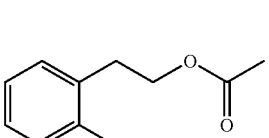

Other non-limiting examples of suitable pendent groups for use with the invention include 2-sulfobenzoyl groups and/or t-butyloxycarbonyl groups. When the pendent group (R) of the latent pigment is either a 2-sulfobenzoyl group or t-butyloxycarbonyl group, the colored pigment can be developed by an acid and thermal activity. The acid can be a regular acid or a photo generated acid. Examples include the following reactions:

Formula 4

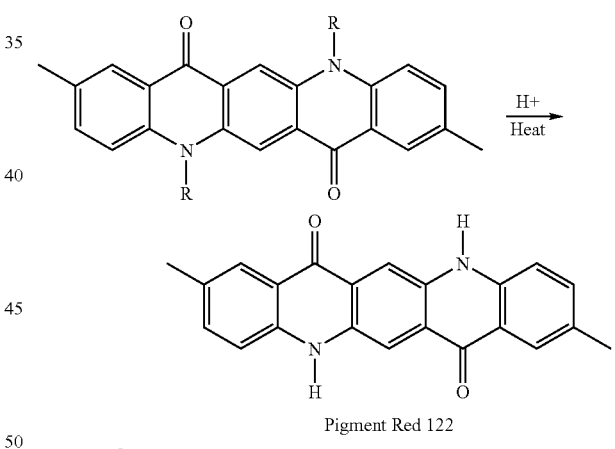
Pigment Red 122

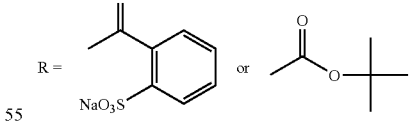

Formula 5

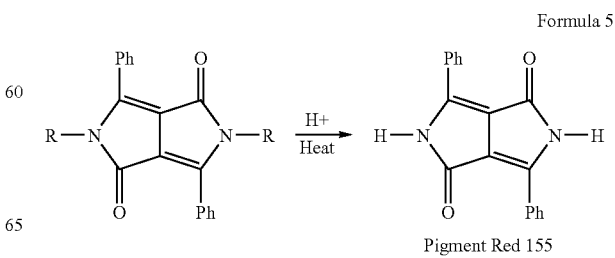
Pigment Red 155

R = 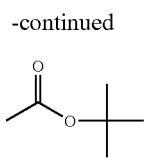

The conditions under which the color forming compositions of the present invention are developed can be varied. For example, one can vary the electromagnetic radiation wavelength, heat flux, and exposure time. The amount of energy which is to be applied depends partially on the activation energy of the development reaction of the latent pigment and the specific radiation antenna chosen. However, the energy applied is typically sufficient to develop the latent pigment without also decomposing the color forming composition or damaging the substrate. Such an energy level is typically well below the energy required for decomposition of the color forming composition. Variables such as spot size, focus, and laser power will also affect any particular system design and can be chosen based on the desired results. With these variables fixed at predetermined values, the radiation source can then direct electromagnetic radiation to the color forming composition in accordance with data received from a signal processor. Further, latent pigment and/or radiation antenna concentration and proximity to one another can also be varied to affect the development times and the optical density of the developed image.

In another specific aspect of the invention, the color forming composition can include a radiation antenna, which can be admixed with or in thermal contact with the latent pigment. The radiation antenna can act as an energy antenna, providing energy to surrounding areas upon interaction with an energy source. As a predetermined amount of energy can be provided by the radiation antenna, matching of the radiation wavelength and intensity to the particular antenna used can be carried out to optimize the system within a desired optimal range. Most common commercial applications can require optimization to a development wavelength of about 200 nm to about 1200 nm, although wavelengths outside this range can be used by adjusting the radiation antenna and color forming composition accordingly. Several common development wavelengths that can be used include 405 nm, 650 nm, 780 nm, and 1084 nm.

Various radiation antennae can act as an antenna to absorb electromagnetic radiation of specific wavelengths and ranges. Generally, a radiation antenna which has a maximum light absorption at or in the vicinity of the desired development wavelength can be suitable for use in the present invention. For example, in one aspect of the present invention, the color forming composition can be optimized within a range for development using infrared radiation having a wavelength from about 720 nm to about 900 nm. Common CD-burning lasers have a wavelength of about 780 nm and can be adapted for forming images by selectively developing portions of the color forming composition. Radiation antennae which can be suitable for use in the infrared range can include, but are not limited to, indolium compounds, polymethyl indolium dyes, metal complex IR dyes, indocyanine green, polymethine dyes such as pyrimidinetrione-cyclopentylidenes, guaiazulenyl dyes, croconium dyes, cyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, hexafunctional polyester oligomers, heterocyclic compounds, and combinations thereof.

Several specific indolium compounds which can be used are available from Aldrich Chemical Company and include 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium perchlorate; 2-[2-[2-Chloro-3-[2-(1,3-dihydro-1,3,3-trimethyl-2H-indol-2-ylidene)-ethylidene]-1-cyclopenten-1-yl-ethenyl]-1,3,3-trimethyl-3H-indolium chloride; 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propylindolium iodide; 2-[2-[2-chloro-3-[(1,3-dihydro-1,3,3-trimethyl-2H-indol-2-ylidene)ethylidene]-1-cyclohexen-1-yl]ethenyl]-1,3,3-trimethylindolium iodide; 2-[2-[2-chloro-3-[(1,3-dihydro-1,3,3-trimethyl-2H-indol-2-ylidene)ethylidene]-1-cyclohexen-1-yl]ethenyl]-1,3,3-trimethylindolium perchlorate; 2-[2-[3-[(1,3-dihydro-3,3-dimethyl-1-propyl-2H-indol-2-ylidene)ethylidene]-2-(phenylthio)-1-cyclohexen-1-yl]ethenyl]-3,3-dimethyl-1-propylindolium perchlorate; and mixtures thereof. Alternatively, the radiation antenna can be an inorganic compound, e.g., ferric oxide, carbon black, selenium, or the like. Polymethine dyes or derivatives thereof such as a pyrimidinetrione-cyclopentylidene, squarylium dyes such as guaiazulenyl dyes, croconium dyes, or mixtures thereof can also be used in the present invention. Suitable pyrimidinetrione-cyclopentylidene infrared antennae include, for example, 2,4,6(1H,3H,5H)-pyrimidinetrione 5-[2,5-bis[(1,3-dihydro-1,1,3-dimethyl-2H-indol-2-ylidene)ethylidene]cyclopentylidene]-1,3-dimethyl-(9CI) (S0322 available from Few Chemicals, Germany).

In another aspect of the present invention, the radiation antenna can be selected for optimization of the color forming composition in a wavelength range from about 600 nm to about 720 nm, such as about 650 nm. Non-limiting examples of suitable radiation antennae for use in this range of wavelengths can include indocyanine dyes such as 3H-indolium, 2-[5-(1,3-dihydro-3,3-dimethyl-1-propyl-2H-indol-2-ylidene)-1,3-pentadienyl]-3,3-dimethyl-1-propyl-,iodide) (Dye 724 λmax 642 nm), 3H-indolium,1-butyl-2-[5-(1-butyl-1,3-dihydro-3,3-dimethyl-2H-indol-2-ylidene)-1,3-pentadienyl]-3,3-dimethyl-,perchlorate (Dye 683 λmax 642 nm), and phenoxazine derivatives such as phenoxazin-5-ium,3,7-bis(diethylamino)-,perchlorate(oxazine 1 λmax=645 nm). Phthalocyanine dyes having a λmax of about the desired development wavelength can also be used such as silicon 2,3-napthalocyanine bis(trihexylsilyloxide) and matrix soluble derivatives of 2,3-napthalocyanine (both commercially available from Aldrich Chemical); matrix soluble derivatives of silicon phthalocyanine (as described in Rodgers, A. J. et al., 107 J. Phys. Chem. A 3503-3514, May 8, 2003), and matrix soluble derivatives of benzophthalocyanines (as described in Aoudia, Mohamed, 119 J. Am. Chem. Soc. 6029-6039, Jul. 2, 1997); phthalocyanine compounds such as those described in U.S. Pat. Nos. 6,015,896 and 6,025,486, which are each incorporated herein by reference; and Cirrus 715 (a phthalocyanine dye available from Avecia, Manchester, England having a λmax=806 nm).

In yet another aspect of the present invention, laser light having blue and indigo wavelengths from about 300 nm to about 600 nm can be used to develop the color forming compositions. Therefore, the present invention can provide color forming compositions optimized within a range for use in devices that emit wavelengths within this range. Recently developed commercial lasers found in certain DVD and laser disk recording equipment provide for energy at a wavelength of about 405 nm. Thus, the compositions of the present invention using appropriate radiation antennae can be suited for use with components that are already available on the market or are readily modified to accomplish imaging. Radiation antennae which can be useful for optimization in the blue (~405 nm) and indigo wavelengths can include, but are not limited to, aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-one disodium salt ($\lambda$ max=400 nm); ethyl 7-diethylaminocoumarin-3-carboxylate ($\lambda$ max=418 nm); 3,3'-diethylthiacyanine ethylsulfate ($\lambda$ max=424 nm); 3-allyl-5-(3-ethyl-4-methyl-2-thiazolinylidene)rhodanine ($\lambda$ max=430 nm) (each available from Organica Feinchemie GmbH Wolfen), and mixtures thereof. Non-limiting specific examples of suitable aluminum quinoline complexes can include tris(8-hydroxyquinolinato)aluminum (CAS 2085-33-8) and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH. Non-limiting examples of specific porphyrin and porphyrin derivatives can include etioporphyrin 1 (CAS 448-71-5), deuteroporphyrin IX 2,4 bis ethylene glycol (D630-9) available from Frontier Scientific, and octaethyl porphrin (CAS 2683-82-1), azo dyes such as Mordant Orange (CAS 2243-76-7), Merthyl Yellow (CAS 60-11-7), 4-phenylazoaniline (CAS 60-09-3), Alcian Yellow (CAS 61968-76-1), available from Aldrich chemical company, and mixtures thereof.

Regardless of the specific development wavelengths, the radiation antenna can be configured to be in a heat-conductive relationship with the latent pigments of the present invention. For example, the radiation antenna can be solvated or dispersed within the carrier system and/or within a polymer matrix of a carrier system or separate layer. In this way, substantially the entire color forming composition in an exposed area can be heated quickly and substantially simultaneously.

In formulating the color forming composition of the present invention, an optimized composition can depend on a variety of factors, since each component can affect the development properties, e.g., time, color intensity, etc. For example, a color forming composition having a radiation antenna with a maximum absorption of about 780 nm may not develop most rapidly at 780 nm. Thus, the addition of other components and the specific formulation can result in a more optimized composition at a wavelength which does not correspond to the maximum absorption of the radiation antenna. Thus, the process of formulating an optimized color forming composition includes testing formulations to achieve a desired development time using a specific intensity and wavelength of energy to form an acceptable color change.

Consideration can also be given to choosing the radiation antenna such that any light absorbed in the visible range does not adversely affect the graphic display or appearance of the color forming composition either before or after development. For example, in order to achieve a visible contrast between developed areas and non-imaged or non-developed areas of the coating, the latent pigment can be chosen to form a color that is different than that of the background. For example, latent pigments having a developed color such as black, blue, red, magenta, and the like can provide a good contrast to a more yellow background. Optionally, an additional non-latent pigment or dye colorant can be added to the color forming compositions of the present invention or the substrate on which the color forming composition is placed. Any known non-latent pigment colorant can be used to achieve almost any desired background color for a given commercial product. Generally, the radiation antenna, if present, can be in the color forming composition in an amount of from about 0.001 wt % to about 10 wt %, and typically, from about 0.5 wt % to about 1 wt %, although other weight ranges may be desirable depending on the molar absorptivity of the particular antenna.

One specific embodiment of the color forming compositions of the present invention can include a polymer matrix, which acts primarily as a binder. As mentioned above, the latent pigment can be dispersed within the polymer matrix, and such a polymer matrix can be used as the carrier system or within a carrier system. Various polymer matrix materials can influence the development properties of the color forming composition such as development speed, light stability, and wavelengths which can be used to develop the composition. Acceptable polymer matrix materials can also include, by way of example, UV curable polymers such as acrylate derivatives, oligomers, and monomers. Additional examples of matrix materials, prepared and coated as dispersions in water or solvents, solutions, or solid melts include polyvinyl alcohol, polyvinyl chloride, polyvinyl butyral, cellulose esters and blends such as cellulose acetate butyrate, polymers of styrene, butadiene, ethylene, poly carbonates, polymers of vinyl carbonates such as CR39, available from PPG industries, Pittsburgh, and co-polymers of acrylic and allyl carbonate monomers such as BX-946, available form Hampford Research, Strafford, Conn. These components can be dissolved, dispersed, ground and deposited in these matrices, and the films can be formed using commonly known processes such as solvent or carrier evaporation, vacuum heat, drying and processing using light.

According to one exemplary embodiment, the radiation curable polymer, in the form of monomers or oligomers, may be a lacquer configured to form a continuous phase, referred to herein as a matrix phase, when exposed to light having a specific wavelength. More specifically, according to one exemplary embodiment, the radiation curable polymer may include, by way of example, UV-curable matrices such as acrylate derivatives, oligomers, and monomers, with a photo package. A photo package may include a light absorbing species, such as photoinitiators, which initiate reactions for curing of the lacquer, such as, by way of example, benzophenone derivatives. Other examples of photoinitiators for free radical polymerization monomers and oligomers include, but are not limited to, thioxanethone derivatives, anthraquinone derivatives, acetophenones, benzoine ethers, and the like.

According to one exemplary embodiment, the radiation-curable polymer matrix phase may be chosen such that curing is initiated by a form of radiation that does not cause a color change of the latent pigment present in the composition. For example, the radiation-curable polymer matrix may be chosen such that the above-mentioned photo package initiates reactions for curing of the lacquer when exposed to a light having a different wavelength than that of the latent pigment dye. Matrices based on cationic polymerization resins may require photoinitiators based on aromatic diazonium salts, aromatic halonium salts, aromatic sulfonium salts, and metallocene compounds. A suitable lacquer or matrix may also include Nor-Cote CLCDG-1250A (a mixture of UV curable acrylate monomers and oligomers), which contains a photoinitiator (hydroxyl ketone) and organic solvent acrylates, such as methyl methacrylate, hexyl methacrylate, beta-phenoxy ethyl acrylate, and hexamethylenediol diacrylate. Other suitable components for lacquers or matrices may include, but are not limited to, acrylated polyester oligomers, such as CN293 and CN294 as well as CN-292 (low viscosity polyester acrylate oligomer), trimethylolpropane triacrylate commercially known as SR-351, isodecyl acrylate commercially known as SR-395, and 2-(2-ethoxyethoxy)ethyl acrylate commercially known as SR-256, all of which are commercially available from Sartomer Co.

Additionally, binders can be included as part of the polymer matrix. Suitable binders can include, but are not limited to, polymeric materials such as polyacrylate from monomers and oligomers, polyvinyl alcohols, polyvinyl pyrrolidines, polyethylenes, polyphenols or polyphenolic esters, polyurethanes, acrylic polymers, and mixtures thereof. For example, the following binders can be used in the color forming composition of the present invention: cellulose acetate butyrate, ethyl acetate butyrate, polymethyl methacrylate, polyvinyl butyral, and mixtures thereof.

The color forming compositions of the present invention can also include various additional components such as surfactants, colorants, liquid vehicles, stabilizers, UV absorbers, anti-fade agents, plasticizers, and other additives known to those skilled in the art.

In order to reduce development times and increase sensitivity to an applied radiation source, the color forming composition can further include a melting aid. Suitable melting aids can have a melting temperature from about 50° C. to about 150° C. and often from about 70° C. to about 120° C. Melting aids are typically crystalline organic solids which can be melted and mixed with a particular latent pigment. For example, most latent pigments are also available as a solid particulate which is soluble in standard liquid solvents. Thus, the latent pigment and melting aid can be mixed and heated to form a molten mixture. Upon cooling, a latent pigment phase of latent pigment and melting aid is formed which can then be ground into a powder. In some embodiments of the present invention, the percent of latent pigment and melting aid can be adjusted to minimize the melting temperature of the latent pigment phase without interfering with the development properties of the latent pigment. When used, the melting aid can comprise from about 5 wt % to about 25 wt % of the latent pigment phase.

A number of melting aids can be effectively used in the color forming compositions of the present invention. Several non-limiting examples of suitable melting aids include m-terphenyl, p-benzyl biphenyl, alpha-napthyl benzylether, 1,2-bis(3,4)dimethylphenyl ethane, and mixtures thereof. Suitable melting aids can also include aromatic hydrocarbons (or their derivatives) which provide good solvent characteristics with the latent pigment and radiation antennae used in the formulations and methods of the present invention. In general, any material having a high solubility and/or miscibility with the latent pigment to form a glass or co-crystalline phase with the pigment, and which alters the melting property of the pigment may be useful in this process. For example, aromatic hydrocarbons, phenolic ethers, aromatic acid-esters, long chain (C6 or greater) fatty acid esters, polyethylene wax, or the like can also be suitable melting aids.

In certain embodiments of the present invention, it is sometimes desirable to add a plasticizer to improve coating flexibility, durability, and coating performance. Plasticizers can be either solid or liquid plasticizers. Such suitable plasticizers are well known to those skilled in the art, as exemplified in U.S. Pat. No. 3,658,543, which is incorporated herein by reference in its entirety. The plasticizer can be included in either or both of the polymer matrix and the latent pigment phase.

Other additives can also be utilized for producing particular commercial products such as including a colorant to impart additional desired color to the image. The colorants can be color formers which are developed at wavelengths outside the development wavelength range or other types of colorants which can provide a background color. In one embodiment, optional colorants can be standard pigments and/or dyes. For example, the use of an opacifier pigment or other colorant can provide background color to the substrate. The optional colorants can be added to the color forming composition, underprinted, or overprinted, as long as the development of the latent pigment is not prevented from at least some development due to the presence of the optional colorant.

In one embodiment, the color forming composition can be prepared in a solution which is substantially transparent or translucent. Any suitable liquid carrier, e.g., an alcohol with a surfactant, can be used which is compatible with a particular latent pigment, polymer matrix, and/or other components chosen for use. The liquid carrier can include, but is not limited to, solvents such as methylethyl ketone, isopropyl alcohol or other alcohols and diols, water, surfactants, and mixtures thereof. When the color forming composition is prepared in a solution form, it may be desirable to underprint a colored coating over at least a portion of the substrate beneath the color forming composition. The optional colored coating produces a background color that can be visible underneath the solution layer. This colored coating can contain various colorants such as other pigments and/or dyes. In another embodiment, the coatings can contain opacifying agents such as titanium dioxide, zinc oxide, calcium oxide and polymeric pigments.

The color forming composition can be prepared in a number of ways for application to a substrate. Often, a liquid carrier system can be used which can be at least partially removed through known solvent removal processes. Typically, at least a portion of the liquid carrier can be driven off or allowed to evaporate after the coating process is complete. Further, various additional components, such as lubricants, surfactants, and materials imparting moisture resistance, can also be added to provide mechanical protection to the color forming composition. Other overcoat compositions can also be used and are well known to those skilled in the art.

A system for labeling a substrate can comprise an image data source, a substrate having a color forming composition coated thereon, and a laser device operatively connected to the image data source and configured to direct laser energy to and develop portions of the color forming composition. The color forming composition can comprise a carrier system and a latent pigment having a pendent group, wherein the latent pigment is pale in color or colorless while the pendent group is attached, and wherein the latent pigment is convertible to a colored pigment upon removal of the pendent group. Alternatively, the latent pigment can have multiple states of conjugation where the latent pigment is colorless or pale in a first conjugation state, and colored in a second conjugation state. In one detailed embodiment of the invention, the substrate is an optical disk.

Typically, an image to be formed on the surface can be digitally stored and then rasterized or spiralized. The resulting data can be delivered to a radiation source which exposes portions of the color forming composition to radiation while the optical disk is spinning. Any number of electromagnetic radiation sources can be used. Lasers provide a simple and effective way of delivering focused and highly controlled pulsed light at almost any desired wavelength.

The color forming compositions of the present invention can be developed using lasers having from about 15 to 100 mW power output, although lasers having a power outside this range can also be used. Typically, lasers having from about 30 mW to about 50 mW are readily commercially available and work well using the color forming composition described herein. The spot size generated by the laser can be determined by radiation that contacts the substrate at a single point in time. The spot size can be circular, oblong, or other geometric shape, and can range from about 1 μm to about 200 μm along a largest dimension and often from about 10 μm to about 60 μm, though smaller or larger sizes can also be used.

Heat flux is a variable that can be altered as well, and can be from about 0.05 to 5.0 J/cm² in one embodiment, and from about 0.3 to 0.5 J/cm² in a second embodiment. In general, a heat flux of about 3.0 J/cm² can be used, and frequently less than about 0.5 J/cm² can also be achieved with acceptable results. The color forming compositions of the present invention can be optimized by adjusting the concentrations and type of radiation antenna, latent pigment, and polymer matrix. Further, in one specific aspect of this invention, the laser energy has a development wavelength from about 200 nm to about 1200 nm. In one detailed aspect of the invention, the development wavelength is preferably at about 780 nm.

Though any laser can be used to provide energy to the color forming compositions, currently there are many known laser types. Those of particular interest include those commercially available which can be incorporated into an optical disk reading and/or writing device, particularly those in the 200 nm to 1200 nm wavelength range. However, wavelengths outside of this range are also included in accordance with embodiments of the present invention. Exemplary laser types that can be used include krypton-fluoride excimer (249 nm), xenon-chloride eximer (308 nm), nitrogen gas (337 nm), organic dye in solution (300 nm to 1000 nm—tunable), krypton ion (335 nm to 800 nm), argon ion (450 nm to 530 nm), helium neon (543 nm, 632.8 nm, and 1150 nm), semiconductor GaInP family (670 nm to 680 nm), ruby (694 nm), semiconductor GaAlAs family (750 nm to 900 nm), neodymium YAG (1064 nm), semiconductor InGaAsP family (1300 nm to 1600 nm), hydrogen-fluoride chemical (2600 nm to 3000 nm), etc. In addition to the above, these and other commercially available lasers are available having wavelengths of: 375 nm, 405 nm, 408 nm, 440 nm, 635 nm, 638 nm, 650 nm, 660 nm, 670 nm, 685 nm, 780 nm, 785 nm, 810 nm, 830 nm, 850 nm, 980 nm, 1084 nm, 1310 nm, and 1550 nm, for example. These laser-types or others are useable in accordance with embodiments of the present invention, provided the laser energy is functional with the color forming compositions in accordance with embodiments of the present invention.

In another embodiment, a method of forming a color image on a substrate can comprise positioning a substrate having a color forming composition coated thereon adjacent to a laser energy source, and applying laser energy from the laser energy source to the color forming composition at a development wavelength and energy density (e.g., J/cm²) sufficient to develop the latent pigment. The color forming composition can comprise a carrier system and a latent pigment having a pendent group, wherein the latent pigment is colorless or pale in color while the pendent group is attached, and wherein the latent pigment is convertible to a colored pigment upon removal of the pendent group. Alternatively, the latent pigment can have multiple states of conjugation where the latent pigment is colorless or pale in a first conjugation state, and colored in a second conjugation state. In one specific aspect of the invention, the laser energy has a development wavelength from about 200 nm to about 1200 nm. In another specific aspect of the invention, the laser energy has an energy level from about 0.3 J/cm² to about 3.0 J/cm².

In still another embodiment, a substrate having a color forming composition coated thereon is also disclosed. The color forming composition can comprise a carrier system and a latent pigment having a pendent group, wherein the latent pigment is colorless or pale in color while the pendent group is attached, and wherein the latent pigment is convertible to a colored pigment upon removal of the pendent group. Alternatively, the latent pigment can have multiple states of conjugation where the latent pigment is colorless or pale in a first conjugation state, and colored in a second conjugation state. In a specific aspect of the invention, the substrate having a color forming composition coated thereon is an optical disk.

The composition can be applied to the substrate using any known technique such as spin-coating, screen printing, sputtering, spray coating, ink-jetting, or the like. A variety of substrates can be used such as an optical disk, polymeric surface, glass, ceramic, metal, or paper. In one embodiment, the color forming composition can be applied to an optical disk and select portions thereof developed using a laser or other radiation source.

EXAMPLES

The following examples of color forming compositions are provided to promote a more clear understanding of the possible combinations of the present invention, and are in no way meant as a limitation thereon. It is to be understood that the following arrangements are illustrative of the application for the principles of the present invention. Numerous modifications and alternative arrangements can be devised without departing from the spirit and scope of the present invention while the present invention has been described above in connection with the exemplary embodiment(s) of the invention. It will be apparent to those of ordinary skill in the art that numerous modifications can be made without departing from the principles and concepts of the invention as set forth in the claims.

Example 1

Development of Latent Pigment Using Thermal Energy

A matrix material having a latent pigment, such as Latent Pigment 1 or 2 shown below, dissolved therein is prepared by mixing the latent pigment with a UV-curable matrix to a concentration from about 5 wt % to about 50 wt %. The UV-curable matrix also includes 0.05 wt % to 2.0% Cirrus 715 (Avecia, Manchester, England), which is an infrared dye with a maximum wavelength of 806 nm.

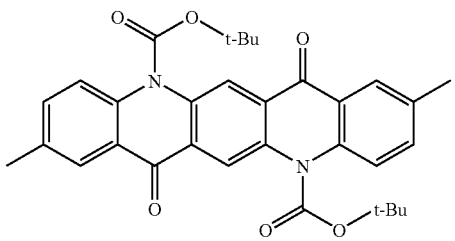

Latent Pigment 1
Di-t-butyl carbamate
adduct of quinacridone

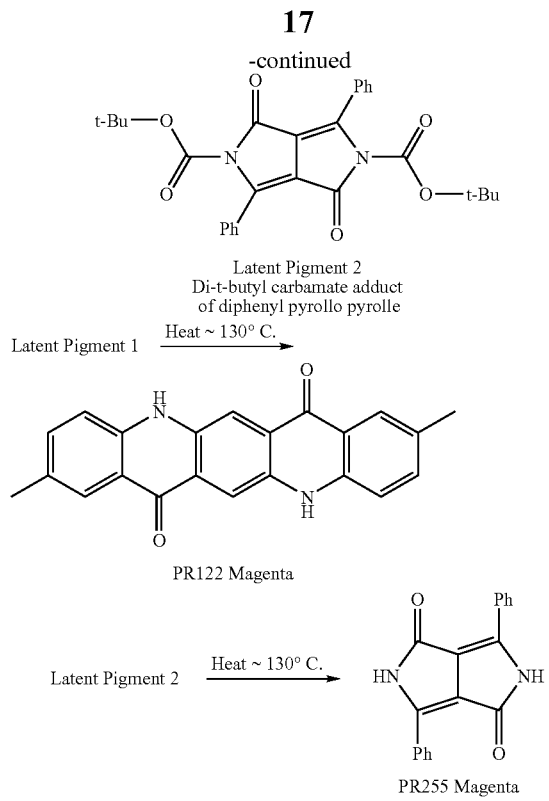

Latent Pigment 1 →(Heat ~ 130° C.) Latent Pigment 2 Di-t-butyl carbamate adduct of diphenyl pyrollo pyrolle PR122 Magenta Latent Pigment 2 →(Heat ~ 130° C.) PR255 Magenta Applying thermal energy of about 130° C. to a coating having a 1-10 μm thickness develops the latent pigment and forms the colored pigment, shown above as PR122 Magenta or diketopyrrolopyrrole (DPP) Magenta. Increasing the wt % of the latent pigment between 5 w % and 50 wt % and/or modifying the thickness has the effect of modifying the color properties of the development.

Example 2

Development of Latent Pigment Using Heat and Acid

A UV-curable matrix having a p-toluene sulfonic acid and a radiation antenna dye dissolved therein is prepared. The latent pigment used is Latent Pigment 3 shown below, which is insoluble in the UV curable matrix. Thus, Latent Pigment 3 is finely ground and evenly dispersed throughout the UV curable matrix at a 5 wt % to 15 wt % concentration.

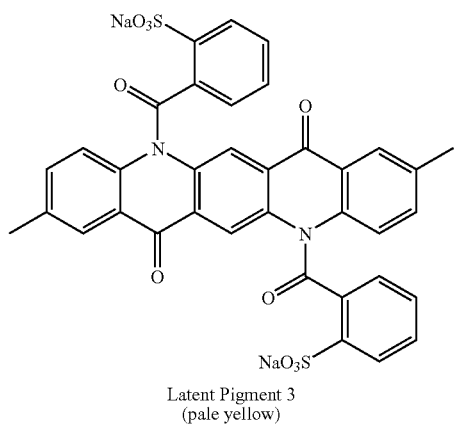

Latent Pigment 3 (pale yellow)

Exposing a 1-10 μm thick coating of the composition prepared above to a wavelength matched to the radiation antenna dye (generating heat of at least 130° C.) causes melting and/or diffusion of Latent Pigment 3. Upon interaction between the p-toluene sulfonic acid and Latent Pigment 3, magenta pigment PR122 is generated.

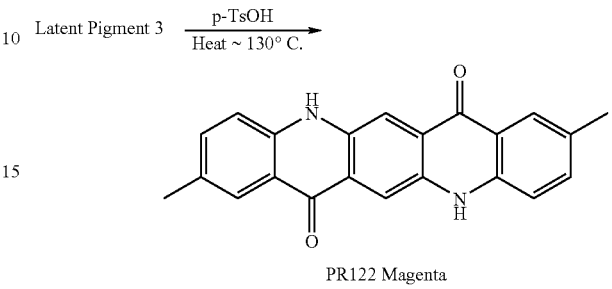

PR122 Magenta

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A color forming composition, comprising:
    a) a carrier system comprising a polymer matrix; and
    b) a latent pigment having:
        i) a pendent group of N-3-(4-hydroxyphenyl)propionyl group, wherein the latent pigment is pale in color or colorless while the pendent group is attached, and wherein the latent pigment is convertible to a colored pigment upon removal of the pendent group; or
        ii) multiple conjugation states, wherein the latent pigment is pale in color or colorless in a first conjugation state, and wherein the latent pigment is convertible to a colored pigment in a second conjugation state
    wherein the color forming composition is capable of development using radiation at less than about 0.5 J/cm² in less than about 1 millisecond.

2. The composition of claim 1, wherein the latent pigment has a pendent group and becomes insoluble in the carrier system upon removal of the pendent group.

3. The composition of claim 1, wherein the latent pigment is a dihydroquinacridone pigment.

4. The composition of claim 3, wherein the color forming composition is capable of development using a chemical oxidation reaction to remove the pendent group.

5. The composition of claim 1, wherein the latent pigment is a magenta colorant selected from the group of diketopyrrolopyrroles, perylenes, anthraquinones, quinophthalones, isoindolinones, isoindolines, dioxazines, azos, and combinations thereof.

6. The composition of claim 1, wherein the latent pigment is a cyan colorant selected from the group of indanthrones, indigos, and combinations thereof.

7. The composition of claim 1, wherein the latent pigment is a yellow colorant selected from the group of isoindolines, quinolonoquinolones, anthraquinones, disazos, benzimidazolones, azos, and combinations thereof.

8. The composition of claim 1, wherein the latent pigment has a pendent group and the pendent group is a photo labile pendent group.

9. The composition of claim 1, wherein the latent pigment has a pendent group and the color forming composition is capable of development using laser energy having a wavelength that is suitable for removal of the pendent group.

10. The composition of claim 1, wherein the latent pigment has a pendent group and the color forming composition is capable of development using thermal activity to remove the pendent group.

11. The composition of claim 10, wherein the thermal activity is generated by a radiation antenna.

12. The composition of claim 1, further comprising a radiation antenna admixed with or in thermal contact with the latent pigment.

13. The composition of claim 12, wherein the radiation antenna is selected from the group of aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogenopyryloarylidene dyes, indolizine dyes, pyrylium dyes, quinoid dyes, quinone dyes, azo dyes, and mixtures or derivatives thereof.

14. The composition of claim 1, wherein the latent pigment is dispersed within the polymer matrix.

15. The composition of claim 1, wherein the polymer matrix comprises a UV curable polymer.

16. A method of forming a color image on a substrate, comprising:
    a) positioning a substrate having a color forming composition coated thereon adjacent to a laser energy source, said color forming composition including:
        i) a carrier system comprising a polymer matrix; and
        ii) latent pigments each having:
    pendent groups of N-3-(4-hydroxyphenyl)propionyl group, wherein the latent pigments are colorless or pale in color while the pendent groups are attached, and wherein the latent pigments are convertible to colored pigments upon removal of pendent groups, or multiple conjugation states, wherein the latent pigments are pale in color or colorless in a first conjugation state, and wherein the latent pigments are convertible to colored pigments in a second conjugation state; and
    b) applying sufficient laser energy from the laser energy source to the color forming composition to develop the latent pigments in a portion of the color forming composition.

17. The method of claim 16, wherein the laser energy has a development wavelength from about 200 nm to about 1200 nm.

18. The method of claim 16, wherein the laser energy has an energy level from about 0.3 J/cm$^2$ to about 3.0 J/cm$^2$.

19. The method of claim 16, wherein the color forming composition further comprises a radiation antenna.

20. The method of claim 19, wherein the radiation antenna is a member selected from the group of aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogenopyryloarylidene dyes, indolizine dyes, merocyanine dyes, pyrylium dyes, quinoid dyes, quinone dyes, azo dyes, and mixtures or derivatives thereof.

21. The method of claim 16, wherein the polymer matrix further comprises a UV curable polymer.

22. The method of claim 16, wherein the color forming composition is capable of development using electromagnetic radiation applied for about 100 μsec to about 500 μsec.

23. The method of claim 16, wherein the color forming composition is capable of development using electromagnetic radiation applied at a power level from about 30 mW to about 50 mW.

24. A color forming composition, comprising:
    a) a carrier system comprising a polymer matrix; and
    b) a latent pigment having a pendent group of N-3-(4-hydroxyphenyl)propionyl, wherein the latent pigment is pale in color or colorless while the pendent group is attached, and wherein the latent pigment is convertible to a colored pigment upon removal of the pendent group using a chemical oxidation reaction.

25. The composition of claim 24, wherein the polymer matrix comprises a UV curable polymer.

26. The composition of claim 24, wherein the color forming composition is capable of development using radiation at less than about 0.5 J/cm$^2$ in less than about 1 millisecond.

* * * * *